(12) United States Patent
Yamazaki et al.

(10) Patent No.: US 6,980,829 B2
(45) Date of Patent: Dec. 27, 2005

(54) PORTABLE TERMINAL SYSTEM AND OPERATION METHOD THEREOF

(75) Inventors: Takeshi Yamazaki, Kanagawa (JP); Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 10/277,943

(22) Filed: Oct. 23, 2002

(65) Prior Publication Data

US 2003/0083098 A1    May 1, 2003

(30) Foreign Application Priority Data

Oct. 26, 2001    (JP)    ............................. 2001-329327

(51) Int. Cl.[7] ................................................ H04B 1/38
(52) U.S. Cl. ................ 455/557; 348/207.1; 348/14.08; 348/211.2; 348/211.11; 348/333.02; 382/181; 382/190
(58) Field of Search .......................... 455/556.1, 550.1, 455/557, 414.4; 348/207.1, 14.08, 211.2, 348/211.11, 333.02, 333.01, 207.2, 94

(56) References Cited

U.S. PATENT DOCUMENTS

| | | | | |
|---|---|---|---|---|
| 6,148,119 | A * | 11/2000 | Takaoka | ...................... 382/289 |
| 6,671,520 | B1 * | 12/2003 | Kim | ......................... 455/556.1 |
| 6,674,874 | B1 * | 1/2004 | Yoshida et al. | .............. 382/100 |
| 2001/0054149 | A1 * | 12/2001 | Kawaguchi et al. | ......... 713/175 |
| 2002/0033844 | A1 * | 3/2002 | Levy et al. | .................. 345/744 |
| 2002/0057823 | A1 * | 5/2002 | Sharma et al. | .............. 382/100 |
| 2002/0102966 | A1 * | 8/2002 | Lev et al. | .................... 455/412 |
| 2003/0072467 | A1 * | 4/2003 | Brundage et al. | ........... 382/100 |
| 2004/0009766 | A1 * | 1/2004 | Hong | ....................... 455/422.1 |
| 2004/0015492 | A1 * | 1/2004 | Fujita et al. | .................... 707/3 |
| 2004/0021549 | A1 * | 2/2004 | Choi et al. | .................... 340/5.8 |
| 2004/0247155 | A1 * | 12/2004 | Eguchi | ........................ 382/100 |

FOREIGN PATENT DOCUMENTS

JP    2001-119562    4/2001

* cited by examiner

*Primary Examiner*—Urban Edward
*Assistant Examiner*—Dai Phuong
(74) *Attorney, Agent, or Firm*—Fitzpatrick, Cella, Harper & Scinto

(57) ABSTRACT

A portable terminal wirelessly transmits a taken still image to a predetermined base station. An image processor receives the still image and extracts a digital watermark from the image. Further, the image processor transmits additional information according to the digital watermark to the portable terminal. Accordingly, various services using a digital watermark technique can be provided by using a portable terminal which can process a high-definition image to which a digital watermark can be embedded.

39 Claims, 12 Drawing Sheets

FIG. 12

| POSITION OF PORTABLE TERMINAL \ PORTABLE TERMINAL ID (DEVICE No. / PHONE NUMBER / USER, ETC.) OR USER ATTRIBUTE | a | b | c | d | e | |
|---|---|---|---|---|---|---|
| LOCATION A | ADDITIONAL INFORMATION $X_{A,a}$ | ADDITIONAL INFORMATION $X_{A,b}$ | ADDITIONAL INFORMATION $X_{A,c}$ | ADDITIONAL INFORMATION $X_{A,d}$ | ADDITIONAL INFORMATION $X_{A,e}$ | .... |
| LOCATION B | ADDITIONAL INFORMATION $X_{B,a}$ | ADDITIONAL INFORMATION $X_{B,b}$ | ADDITIONAL INFORMATION $X_{B,c}$ | ADDITIONAL INFORMATION $X_{B,d}$ | ADDITIONAL INFORMATION $X_{B,e}$ | .... |
| LOCATION F | ADDITIONAL INFORMATION $X_{F,a}$ | ADDITIONAL INFORMATION $X_{F,b}$ | ADDITIONAL INFORMATION $X_{F,c}$ | ADDITIONAL INFORMATION $X_{F,d}$ | ADDITIONAL INFORMATION $X_{F,e}$ | .... |
| LOCATION G | ADDITIONAL INFORMATION $X_{G,a}$ | ADDITIONAL INFORMATION $X_{G,b}$ | ADDITIONAL INFORMATION $X_{G,c}$ | ADDITIONAL INFORMATION $X_{G,d}$ | ADDITIONAL INFORMATION $X_{G,e}$ | .... |
| LOCATION H | ADDITIONAL INFORMATION $X_{H,a}$ | ADDITIONAL INFORMATION $X_{H,b}$ | ADDITIONAL INFORMATION $X_{H,c}$ | ADDITIONAL INFORMATION $X_{H,d}$ | ADDITIONAL INFORMATION $X_{H,e}$ | .... |
| ... | | | | | | |

PORTABLE TERMINAL SYSTEM AND OPERATION METHOD THEREOF

BACKGROUND OF THE INVENTION

1. Field of the Invention

The present invention relates to a portable terminal system for taking an image in which a digital watermark is embedded and extracting the digital watermark from the image and to an operation method thereof.

2. Description of the Related Art

Hitherto, a digital watermark technique has been known. In this technique, additional information (digital watermark), such as information about a copyright holder, is embedded in a still image, a moving image, sound, and so on such that the digital watermark cannot be recognized visually or aurally.

As an embedding method, the following are known. An image or sound is transformed to frequency components, a digital watermark is embedded in a specific component, such as a high frequency component, and then the frequency components are inversely transformed. Alternatively, a digital watermark may be embedded in an image or sound by adding/subtracting a predetermined value to/from the image or sound in a predetermined period.

A function of embedding a digital watermark into an image and a function of extracting a digital watermark from an image are often used for the purpose of protecting copyrights and preventing falsification. In these cases, high-definition/multiple tone images are often used. Accordingly, a stationary high-performance image processor is required.

In recent years, however, the performance of portable terminals such as portable phones has become higher, and these portable terminals can process high-definition images and high-quality sound.

SUMMARY OF THE INVENTION

The present invention has been made in view of the above-described circumstances. It is an object of the present invention to provide various services using a digital watermark technique by using a portable terminal which can process a high-definition image to which a digital watermark can be embedded.

In order to achieve the above-described object, a portable terminal system of the present invention comprises a portable terminal provided with a camera inside or outside thereof, the camera being able to take a still image; and an image processor performing wireless communication with the portable terminal through a predetermined base station. The portable terminal comprises a holding unit for holding the still image taken by using the camera; and a wireless communication unit for wirelessly transmitting the still image held by the holding unit to the predetermined base station. The image processor comprises a receiving unit for receiving the still image through the predetermined base station; an extracting unit for extracting a digital watermark embedded in the still image received by the receiving unit, the digital watermark being visually imperceptible; and a returning unit for returning additional information according to the digital watermark extracted by the extracting unit to the predetermined base station. The portable terminal receives the additional information through the predetermined base station by using the wireless communication unit so as to hold the additional information in the holding unit.

Further objects, features and advantages of the present invention will become apparent from the following description of the preferred embodiments with reference to the attached drawings.

BRIEF DESCRIPTION OF THE DRAWINGS

FIG. 12 is a conceptual diagram showing a table of additional information to be transmitted by the image processor.

DESCRIPTION OF THE PREFERRED EMBODIMENTS

Hereinafter, preferred embodiments of the present invention will be described.

First Embodiment

Figure 1:
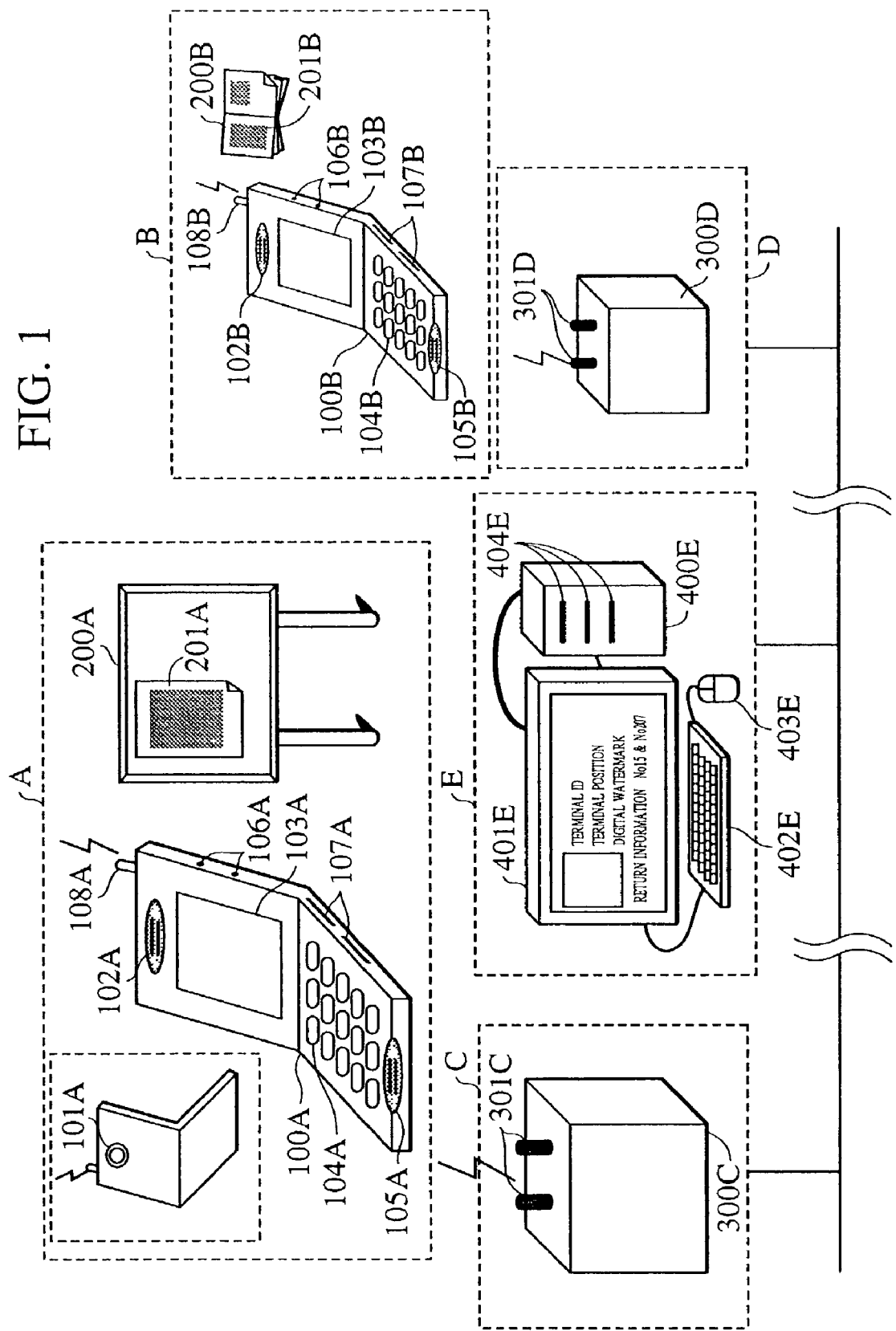
FIG. 1 is the overview of a portable terminal system.

FIG. 1 is a schematic view showing the overall portable terminal system according to a first embodiment.

1. System Overview

In FIG. 1, reference letters A to E denote locations which are different from each other. Location A and Location C, and Location B and Location D are relatively close to each other for reasons described later.

The system includes portable terminals 100A and 100B which can perform wireless communication. Each of Location A and Location B covers the range of about 0 to 5 m from the location where a user of the portable terminal 100A or 100B exists. Reference numeral 200A denotes an advertising board or the like which exists at Location A.

An image 201A in which a digital watermark is embedded is displayed on a part of the board, the digital watermark will be described later. Also, reference numeral 200B denotes a magazine or the like which exists at Location B. An image 201B in which a digital watermark is embedded is printed on a page of the magazine.

The system also includes a base station 300C which is suitable for wireless communication with the portable terminal 100A (most suitable because the base station 300C is close to the portable terminal 100A). The base station 300C is placed at Location C which is close to Location A. Also, a base station 300D, which is suitable for wireless communication with the portable terminal 100B, is placed at Location D which is close to Location B.

Herein, the base stations 300C and 300D include antennas 301C and 301D, respectively, for performing wireless communication. If the portable terminals 100A and 100B do not move to another location, the base station 300C wirelessly communicates with the portable terminal 100A and the base station 300D wirelessly communicates with the portable terminal 100B so that data communication is performed between each of the portable terminals 100A and 100B and various devices.

If the user carrying the portable terminal moves, a base station which wirelessly communicates with the portable terminal is changed to another base station which is closer to the portable terminal.

Naturally, each of the portable terminals communicates with the closest base station for optimization. Therefore, each of the base stations or a management device for managing the base stations can easily determine the approximate position of each terminal by recognizing an associated terminal. This function is known in the art as a so-called PHS, and thus a detailed description will be omitted.

The system also includes an image processor 400E which can process many images simultaneously and which operates for extracting a digital watermark, which will be described later.

2. Basic Configuration of Portable Terminal

Figure 2:
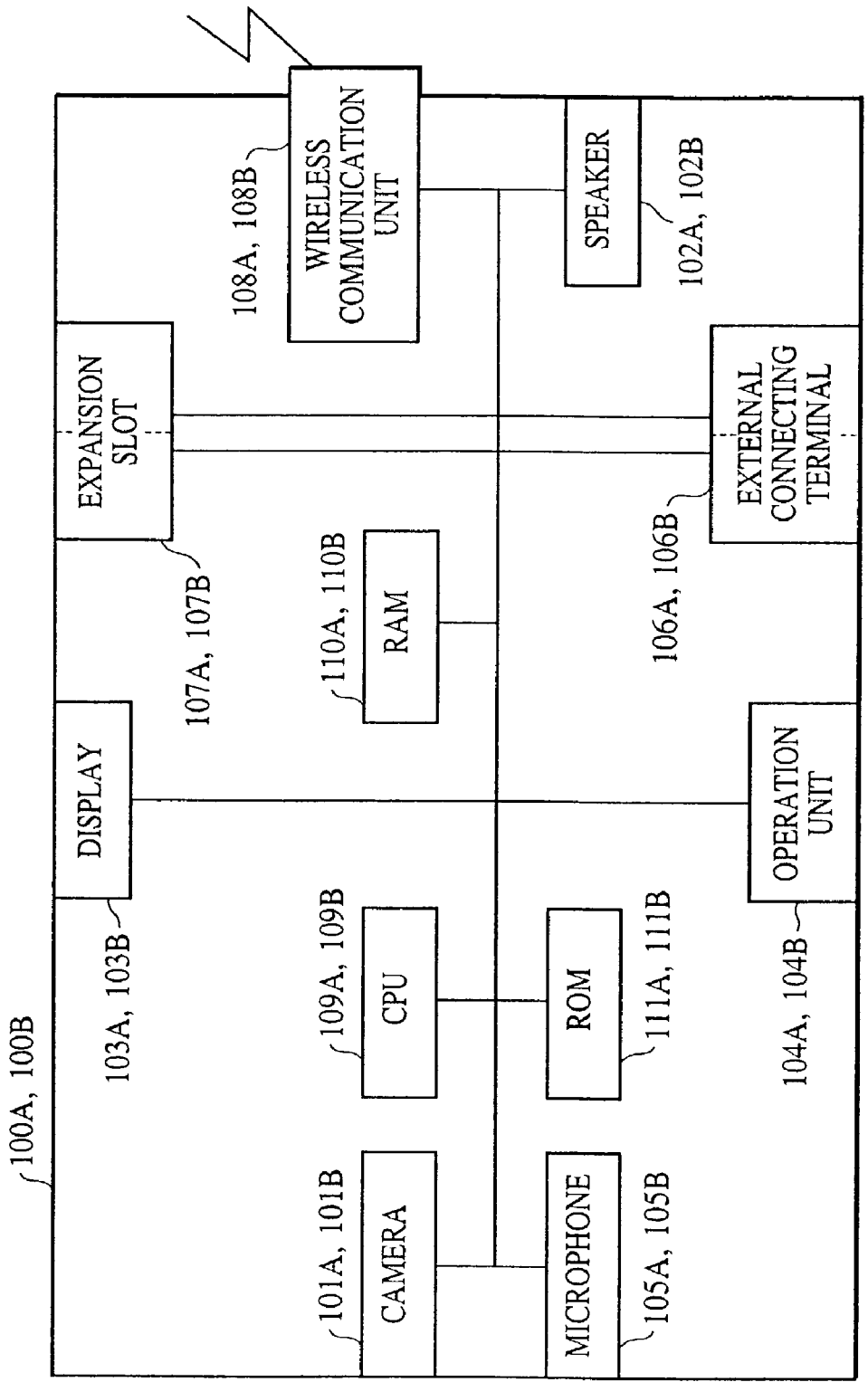
FIG. 2 shows an internal configuration of a portable terminal.

Next, a schematic configuration of the portable terminals 100A and 100B will be described. FIG. 2 shows a simplified internal configuration of the portable terminal 100A or 100B. The configurations of the two portable terminals 100A and 100B are the same, and thus are described with reference to the same figure. In FIG. 2, parts common to those in FIG. 1 are denoted by the same reference numerals and a duplicate description will be omitted.

Referring to FIG. 2, the portable terminals 100A and 100B include CPUs 109A and 109B, RAMs 110A and 110B, and ROMs 111A and 111B, respectively. Each of the CPUs controls the operation of each unit, which will be described later, based on a control program stored in the ROM or the RAM. Each of the RAMs 110A and 110B is mainly used as a temporary memory when image processing/communication is performed, and is also used for storing a program for executing preprocessing of extraction of a digital watermark.

Referring to FIGS. 1 and 2, compact cameras 101A and 101B are included in or attached to the portable terminals 100A and 100B, respectively, and photograph an object outside the terminal so as to generate image data. The image data is stored in the RAM 110A or 110B for image processing/communication performed in a subsequent stage.

Also, the portable terminals 100A and 100B include speakers 102A and 102B, respectively, which can output sound stored in the RAMs 110A and 110B or sound received by wireless communication.

Displays 103A and 103B display images being taken by the compact cameras 101A and 101B, images stored in the RAMs 110A and 110B, or images received by wireless communication, and also display various operation guides of the portable terminals.

Operation units 104A and 104B are used for manually instructing various operations of the portable terminals and are also used for inputting a telephone number of an addressee and for inputting character data to be transmitted.

Microphones 105A and 105B detect a user's voice or sounds in the vicinity, convert the voice or the sound to sound data, and then store the data in the RAMs 110A and 110B or directly transmit the data to an addressee.

External connecting terminals 106A and 106B are interfaces used for connecting with an external device in order to input information or to output information stored in the terminal to the external device.

The portable terminals 100A and 100B also include expansion slots 107A and 107B, respectively. The function can be expanded by connecting a storage medium for storing a program, except for the ROMs and RAMs, to the expansion slots 107A and 107B. Also, the expansion slots 107A and 107B function as interfaces to which a storage medium can be connected as an expansion memory for overcoming a capacity shortage of the RAMs 110A and 110B.

Wireless communication units 108A and 108B have a function for wirelessly transmitting/receiving sound, images, and other data to/from the corresponding base station 300C or 300D, in accordance with predetermined processes.

3. Basic Configuration of Image Processor

Figure 3:
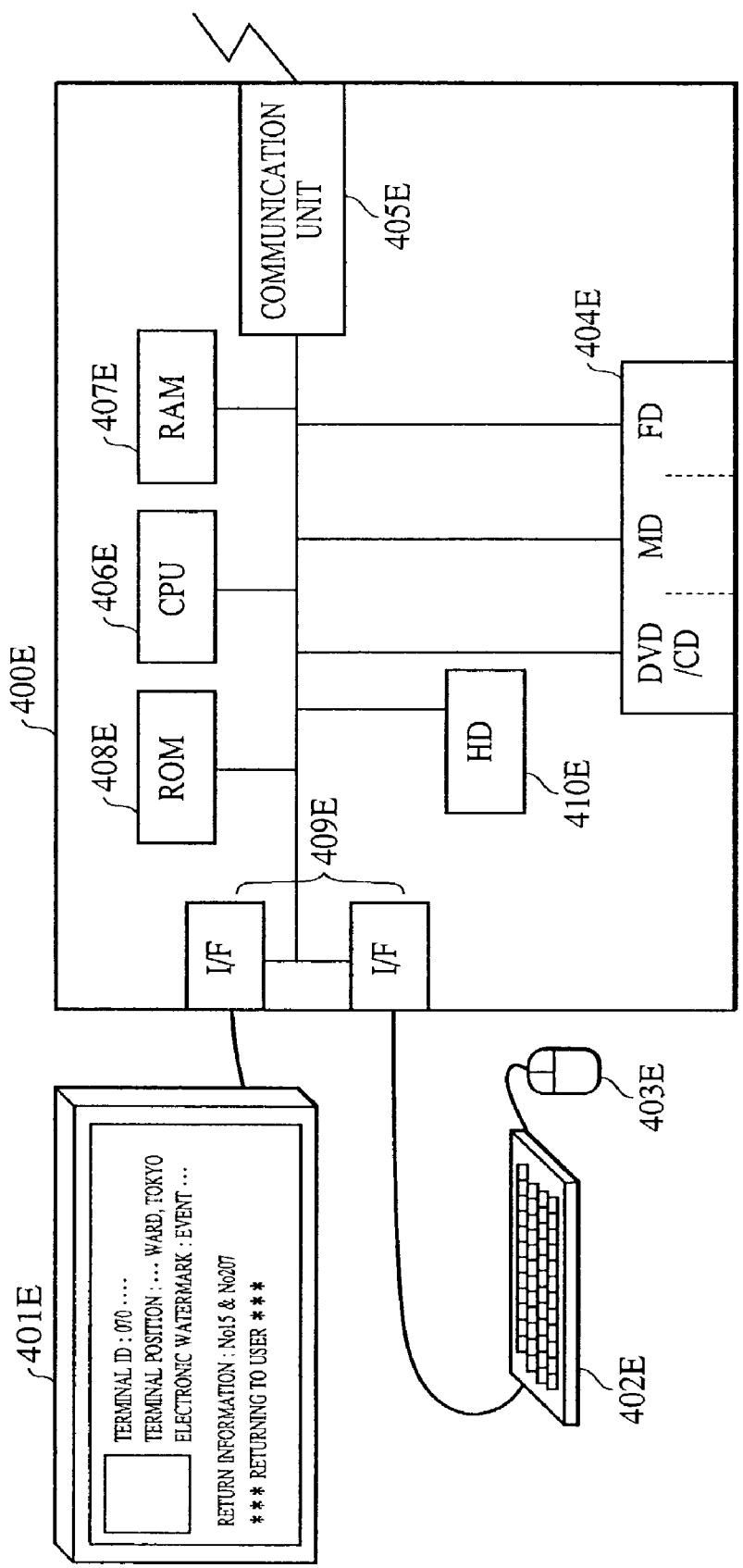
FIG. 3 shows the configuration of an image processor and peripheral devices thereof.

Next, a schematic configuration of the image processor 400E and the configuration of peripheral devices thereof will be described with reference to FIG. 3. In FIG. 3, parts common to those in FIG. 1 are denoted by the same reference numerals and a duplicate description will be omitted.

Although not shown in this embodiment, an image processor having the same function as the image processor 400E may be provided in the present invention. That image processor is included in the scope of the present invention even if the image processor performs services independently.

The image processor 400E includes a main body 400E, a display 401E serving as a peripheral device, a keyboard 402E for manually inputting instructions to the main body, and a pointing device (mouse) 403E.

In this embodiment, only the main body is regarded as the image processor 400E. In the present invention, however, the main body and the peripheral devices thereof may be regarded as the image processor 400E. That is, the peripheral devices may exist in other forms, for example, the display 401E may be a liquid crystal display provided inside the main body 400E and the keyboard 402E may be attached to the main body 400E. Also, various types of pointing devices may be used as the pointing device 403E, which may be attached to the main body 400E.

In FIG. 3, the main body 400E includes a CPU 406E, a RAM 407E, and a ROM 408E. The CPU 406E controls the operation of each unit, which will be described later, based on a control program stored in the RAM 407E or the ROM 408E.

Referring to FIGS. 1 and 3, interfaces 404E are used for using various storage media. A program or various information required for performing the image processing can be read from a floppy disk, an MD, a DVD, a CD, and so on, through the interfaces 404E. Also, the interface 404E can allow an MD, a DVD, a CD-R, and so on to store or save information held in the image processor.

In FIG. 3, a communication unit 405E has a function of wire/wirelessly communicating with the base station 300C or 300D via a base station (not shown) relaying the communication from the image processor 400E, in order to perform data communication with the portable terminals 100A and 100B shown in FIG. 1. In the present invention, whether wireless communication or wired communication is performed between the communication unit 405E and the base station (not shown) relaying the data communication from the image processor 400E is not important, and thus is not specified.

Also, the image processor 400E includes interfaces 409E used for outputting images and sound to the display 401E, inputting instruction signals from the keyboard 402E or the pointing device (mouse) 403E so as to transmit the signals to each unit of the image processor 400E, and transmitting/receiving various control signals to/from the above-described various devices.

A high-capacity hard disk 410E can store data required for various processing described later.

4. Processes of Basic Operation

Next, major processes of a service performed by using the portable terminal 100A or 100B and the image processor 400E will be described with reference to flowcharts shown in FIGS. 4 and 5.

Figure 4:
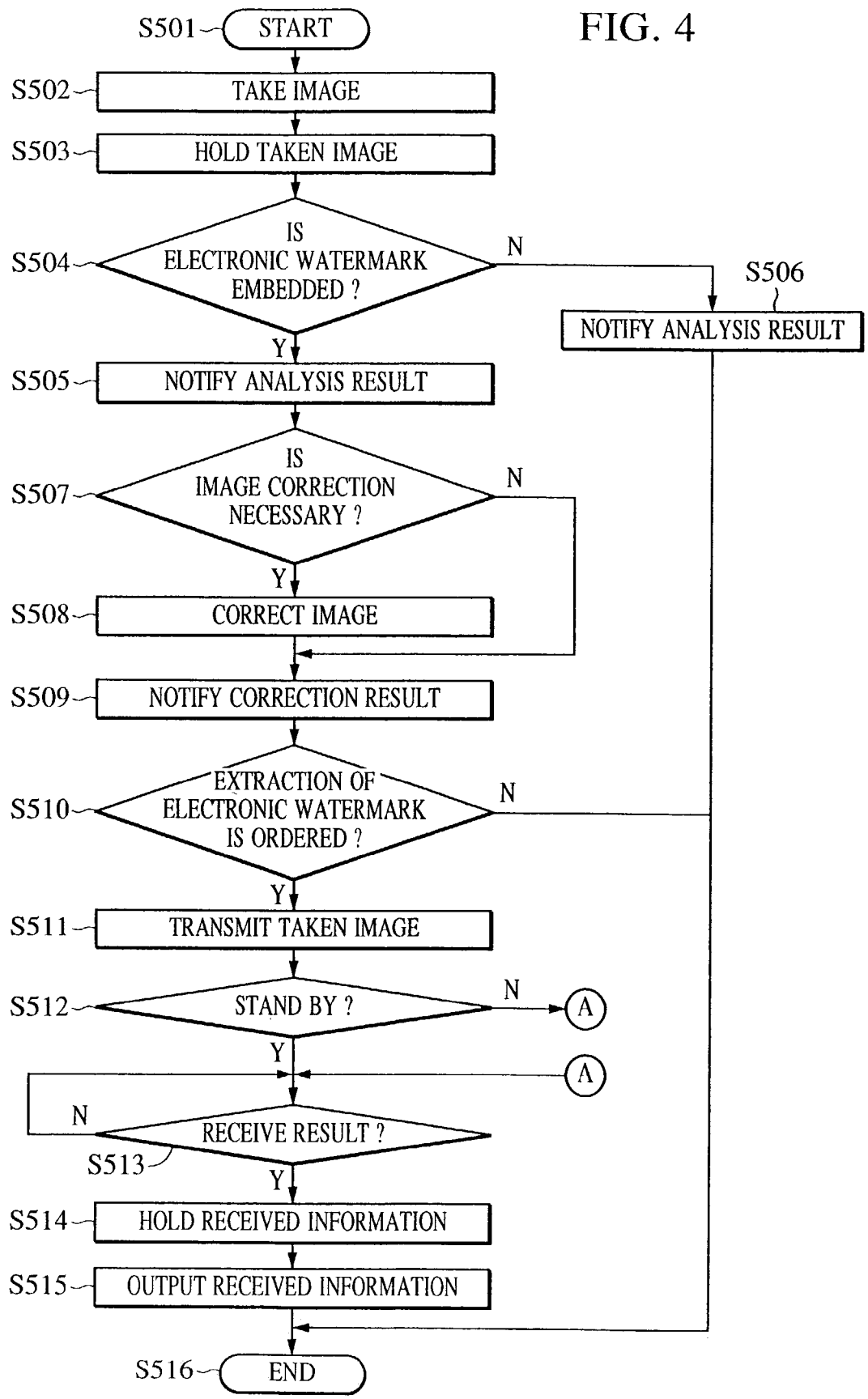
FIG. 4 is a flowchart illustrating processes performed by the portable terminal.

FIG. 4 shows a flowchart of processes performed by the portable terminal 100A or 100B. FIG. 5 shows a flowchart of processes performed by the image processor 400E.

As described above, the operation control of each terminal/processor is performed by the internal CPU in accordance with a program stored in the ROM or the RAM.

Also, in the following description, the processing in the portable terminal 100A is the same as that in the portable terminal 100B. Thus, the operation of the terminal 100A will be described and the description for the terminal 100B will be omitted.

4-1. Operation Processes of Portable Terminal 100A or 100B

Referring to FIG. 4, when instructions for extracting a digital watermark of the image 201A are input by using the operation unit 104A of the portable terminal 100A (S501), the speaker 102A or the display 103A of the portable terminal 100A outputs sound or displays a message: "take an image by using the camera", so as to encourage a user to take the image. Accordingly, the user takes the image 201A in which a digital watermark is expected to be embedded (S502).

The taken image is temporarily held in the RAM 110A of the terminal 100A or in the expansion memory in the expansion slot 107A (S503).

Next, the terminal 100A analyzes whether or not a digital watermark is embedded in the taken image by using a program for analyzing the taken image, the program being downloaded through the wireless communication unit 108A or the external connecting terminal 106A in advance (S504). Herein, a known analysis method can be used. The details will be described later.

In view of the memory usage efficiency of the portable terminal, it is desirable to download the analysis program used in S504 from the image processor 400E through the communication unit 405E, the base station 300C, the wireless communication unit 108A, and so on, as a preprocessing of S501 when the analysis is expected to be required.

At S504, when a digital watermark is not embedded in the taken image, that fact is indicated through the speaker 102A or the display 103A (S506). Then, since a further process for extracting a digital watermark is not necessary, the terminal 100A does not perform the subsequent processes and returns to a normal operation mode (S516).

On the other hand, when a digital watermark is embedded in the taken image at S504, that fact is indicated through the speaker 102A or the display 103A (S505). Further, it is analyzed whether or not image correction is necessary before extracting the digital watermark from the taken image (S507). Herein, a known analysis method, which will be described later, can be used. In this case, the image correction means a geometric correction such as a rotation and scaling of the image.

In view of the memory usage efficiency of the portable terminal, it is desirable to download the analysis program used in S507 from the image processor 400E through the communication unit 405E, the base station 300C, the wireless communication unit 108A, and so on, as a preprocessing of S501 when the analysis is expected to be required.

When image correction is necessary before extracting the digital watermark from the taken image at S507, image correction, which will be described later, is performed (S508), and then the details of the correction (how the image was corrected) are indicated through the speaker 102A or the display 103A (S509). In particular, the display 103A displays the state of the image after the correction. Incidentally, S507 to S509 are optional and do not have to be performed in the portable terminal. In that case, however, these processes must be performed by the image processor 400E.

On the other hand, when correction is not necessary before extracting the digital watermark from the taken image at S507, image correction is not performed and that fact is indicated through the speaker 102A or the display 103A (S509).

Then, it is determined whether or not instructions for allowing the image processor 400E to extract the digital watermark from the image 201A after analysis at S504 and S507 (image 201A' when the image is corrected at S508) are input to the terminal 100A through the operation unit 104A (S510). When the instructions are not input during a predetermined period of time, or when instructions for canceling extraction are input, the process is completed (S516).

On the other hand, when instructions for extracting the digital watermark is input to the terminal 100A through the operation unit 104A, the taken image 201A or 201A' is transmitted. That is, the taken image 201A or 201A' is transmitted to the image processor 400E through the wireless communication unit 108A, the base station 300C, the communication unit 405E, and so on (S511).

Further, the RAM 110A of the terminal 100A holds ID information unique to the terminal 100A; a telephone number; a device number; model information; attribute information such as the sex, hobby, and status of the user; information about the location where the terminal currently exists; and so on in advance. When the image is transmitted, all pieces of the information are transmitted together as additional information.

When the image and the additional information have been transmitted to the image processor 400E, processes are then performed by the image processor 400E, and thus the operation of the portable terminal 100A temporarily stops or enters a standby mode. Accordingly, whether the portable terminal 100A waits for future operation while maintaining communication with the image processor 400E or temporarily stops the communication (state A) and starts the subsequent processes after several minutes can be instructed by using the operation unit 104A of the portable terminal 100A. At S512, it is determined which instruction is input so as to decide whether or not the communication should be maintained.

The portable terminal 100A waits until it receives a result generated by extracting the digital watermark, in a state that communication is maintained from S512 or that the portable terminal 100A comes back from the state A and starts communication with the image processor 400E (S513).

After the portable terminal 100A receives the result, the result is temporarily held in the RAM 110A or in the expansion memory in the expansion slot 107A (S514).

Then, the portable terminal 100A outputs/displays the information to the speaker 102A or on the display 103A (S515).

4-2. Operation Processes of Image Processor 400E

Figure 5:
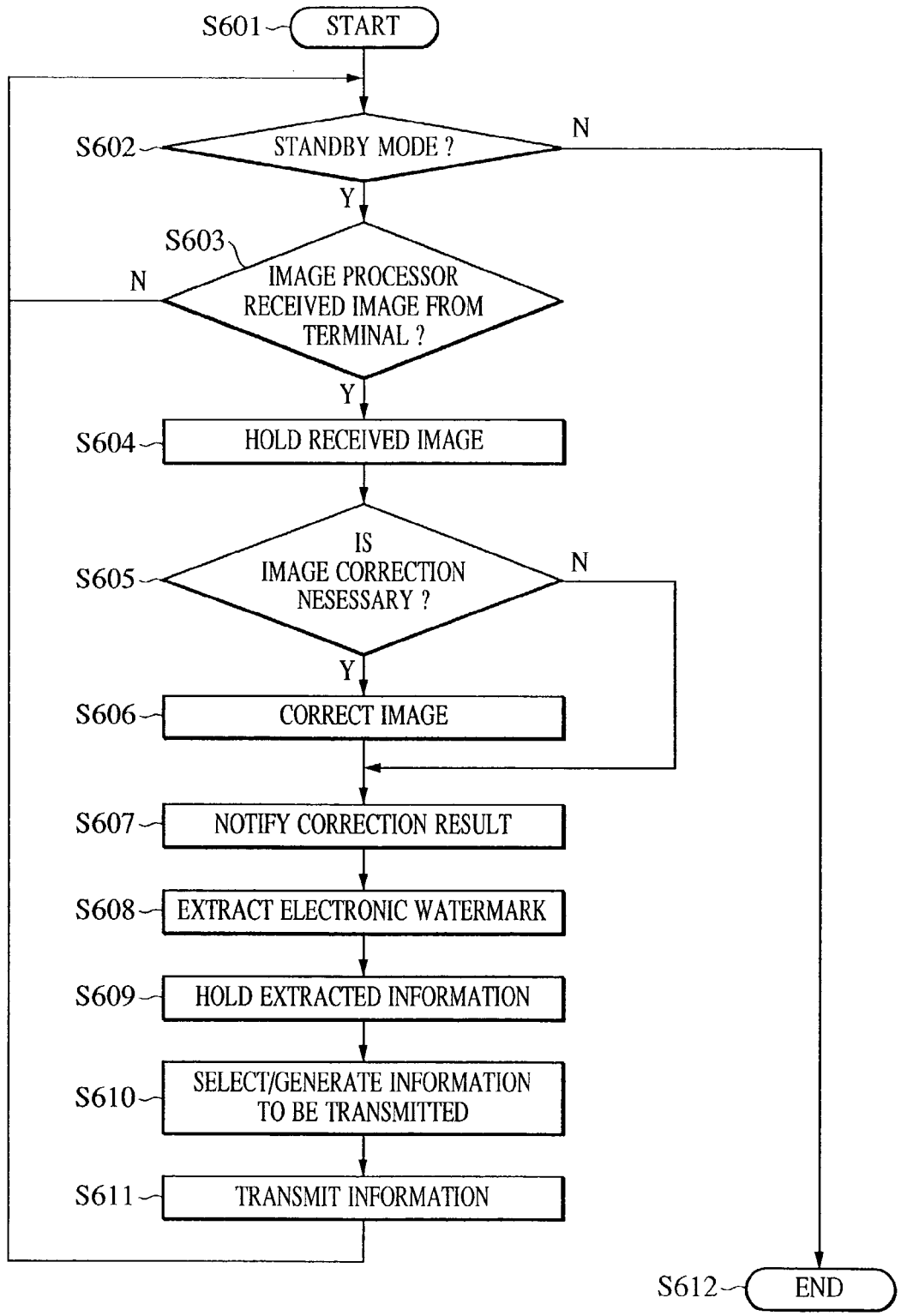
FIG. 5 is a flowchart illustrating processes performed by the image processor.

Referring to FIG. 5, the image processor 400E starts a normal operation (S601), and then determines whether or not the image processor 400E is set to a standby mode for waiting for reception of an image from the portable terminal 100A or 100B requiring extraction of a digital watermark (S602). When the image processor 400E is not set to the standby mode, processes for extracting a digital watermark are not performed (S612). When the image processor 400E is set to the standby mode, it enters a monitoring state for monitoring reception of an image from each portable terminal (S603).

For example, when the image processor 400E receives an image from the terminal 100A, the received image in which a digital watermark is to be embedded is temporarily held in the RAM 407E or the HD 410E (S604).

When the image processor 400E receives the image at S604, the image processor 400E also receives and holds the additional information of the image, such as ID information unique to the terminal 100A, which has transmitted the image; a telephone number; a device number; the user; model information; attribute information such as the sex, hobby, and status of the user; information about the location where the terminal currently exists; and so on. In this system, a table-formed database may be provided in the HD 410E or the like in advance so that every piece of information can be simultaneously obtained by receiving only ID information or the telephone number even when the image processor 400E does not receive all pieces of the additional information.

Then, the image processor 400E performs processes S605 to S607 for correcting the image, the processes are different from the above-described processes S507 to S509. Herein, image correction means correction of displacement caused by parallel displacement (offset correction). The indication of a correction result at S607 is performed by the display 401E (or internal speaker (not shown)) instead of the speaker 102A or the display 103A used for the correction processes at S507 to S509.

Next, with the method described later, the digital watermark is extracted from the image which has been corrected (S608).

Information indicated by the extracted digital watermark is temporarily held in the RAM 407E or the HD 410E (S609).

Then, the image processor 400E selects/generates information to be transmitted to the portable terminal 100A which has transmitted the image (S610). In the present invention, the information to be transmitted to the terminal 100A may be the information itself indicated by the digital watermark. However, it is better if information required by the user of the terminal can be effectively transmitted. Accordingly, in this embodiment, the image processor 400E transmits the information directly indicated by the digital watermark to the terminal 100A which has transmitted the image, and selects/generates various information to be transmitted with the method described later, in order to transmit information which is valuable for the user of the terminal.

When information to be transmitted to the terminal is decided, the information is transmitted to the terminal 100A (S611). After the transmission, the process returns to S602.

This is the basic operation of the system. Now, specific processes of each unit described above will be described.

5. Process Before Embedding Digital Watermark

Herein, preprocessing and embedding of a digital watermark applied to the image 201A or 201B taken with the camera will be briefly described.

The image processor (not shown) having the same function as the image processor 400E performs preprocessing for indicating the existence of a digital watermark and for ensuring extraction of the digital watermark and a process of embedding the digital watermark to the image 201A or 201B.

5-1. Addition of Information Indicating Existence of Digital Watermark

Now, an example of how additional information used for determining whether or not a digital watermark is embedded in an image at S504 is embedded in the image 201A or 201B in advance will be described.

In this embodiment, the additional information described here is regarded as being common to additional information which is a reference of image correction described later. Accordingly, the amount of additional information or the load of additional processes can be reduced. However, the present invention is not limited to this, and as described later, the additional information described here and the additional information which is the reference of image correction may be independent from each other.

Also, the additional information commonly-used in this embodiment is a reference signal (also called a registration signal) for detecting the inclination (rotation angle) and the size (scaling ratio) of the image 201A or 201B, with the image which should be naturally recognized being the reference. The reference signal is embedded in the image 201A or 201B such that the reference signal is difficult to be recognized visually. Accordingly, the reference signal may be regarded as a kind of digital watermark.

Japanese Patent Laid-Open No. 2001-119562, which has been filed by the applicant of the present application, discloses how to deal with the above-described additional information having the role of the additional information (registration signal) which is the reference of the image correction. The disclosed art is used in this embodiment and detailed description thereof will be omitted.

Figure 6:
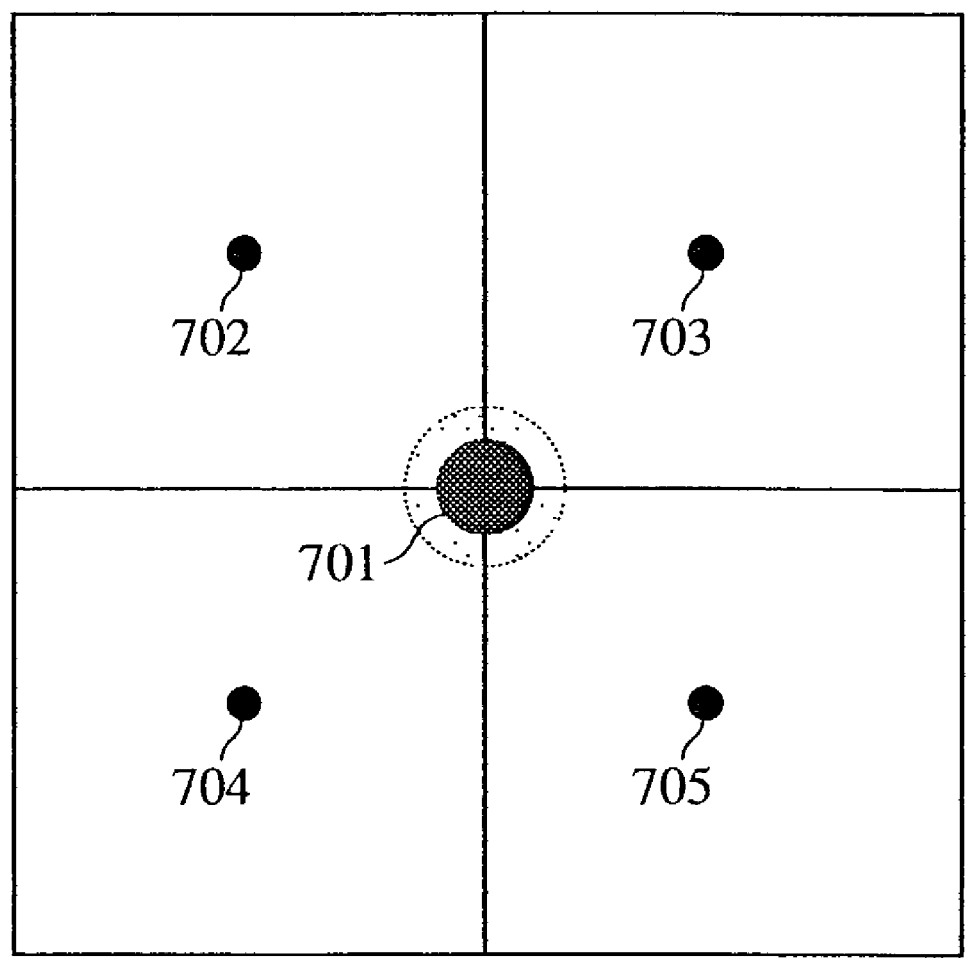
FIG. 6 shows an example of impulse signals in frequency components of an image.

First, the image 201A or 201B is divided into blocks and each of the blocks is frequency-converted. Then, as shown in FIG. 6, after the frequency conversion, impulse signals having a peak which is higher than a predetermined threshold are added to frequency components whose frequency is relatively high. FIG. 6 shows frequency components after the image 201A or 201B is frequency-converted. In the figure, the center represents a low-frequency component, and the frequency becomes higher toward the outside. If the image 201A or 201B is a photograph, components are concentrated to the low-frequency component (center) simply by frequency-converting. Thus, the impulse signals artificially added to medium- or high-frequency components are relatively recognizable. After the adding process, inverse frequency conversion is performed, and then an image substantially the same as the original image 201A or 201B is reproduced. (Then, a digital watermark is embedded).

The impulse signals described above correspond to the additional information (registration signal) used for determining whether or not a digital watermark is embedded in the image. As will be described later, when the image 201A or 201B is taken with the camera, the image may be taken as an image whose inclination and size are different from those of the original image. However, if the impulse signals are embedded in the image, a regular peak based on an embedding rule can be detected by frequency-converting the taken image and by applying a threshold processing to the components whose frequency is higher than a predetermined level. Thus, it can be determined whether or not a digital watermark is embedded in the image when extraction of the digital watermark is performed. Also, the change in the inclination and size from those of the image 201A or 201B, which should be normally recognized, can be detected from the position of the frequency component having the peak. This method is known, and detailed description thereof will be omitted.

5-2. Addition of Information which is a Reference of Image Correction

Next, how the additional information used for analyzing the image correction at S507 and S508 (described in 4-1) is embedded in the image 201A or 201B will be described. In this embodiment, the additional information indicating the existence of the digital watermark described in 5-1 is also used as the additional information which is a reference of image correction, and thus detailed description will be omitted.

Figure 7:
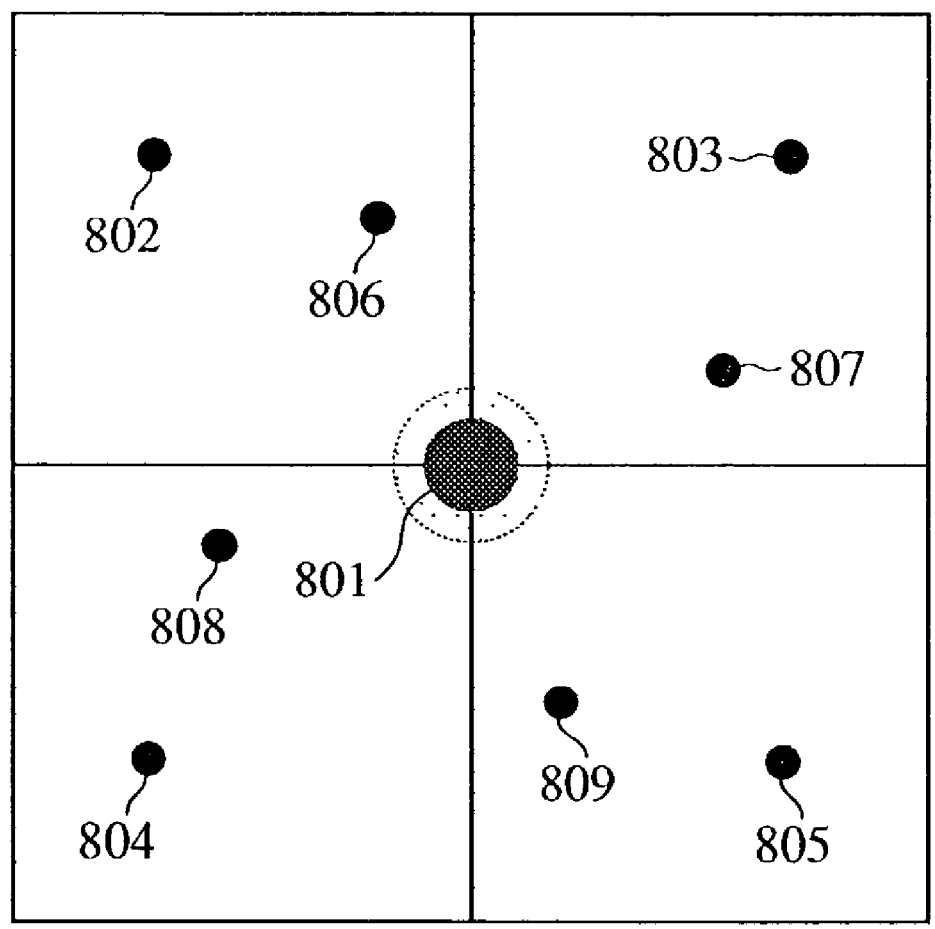
FIG. 7 shows a modification of FIG. 6.

However, the present invention is not limited to this. As shown in FIG. 7, an independent impulse signal for analysis may be embedded in different positions. In that case, the same operation is repeated twice. In FIG. 7, as in FIG. 6, the image 201A or 201B is converted to frequency components and then impulse signals 802 to 809 are added. However, in FIG. 7, four impulse signals 802 to 805 are added as impulse signals referred to for image correction. The other four impulse signals 806 to 809 are added as impulse signals referred to for detecting a digital watermark. In this case, various forms, positioning, and peak of impulse signals according to each purpose can be effectively set.

6. Embedding of Digital Watermark

Next, how a digital watermark is embedded in the image 201A or 201B will be briefly described.

Herein, embedding of a digital watermark means embedding of a digital watermark which should be extracted at S608, that is, embedding of part of information required by the owner or the viewer of the image into the image 201A or 201B. The embedding is performed after the processes described in 5-1 and 5-2.

In this case, for example, a method of embedding a digital watermark disclosed in Japanese Patent Laid-Open No. 2001-119562 (U.S. patent application Ser. No. 615,577), that is, a method of embedding a digital watermark using a so-called patchwork method is adopted.

Figure 8:
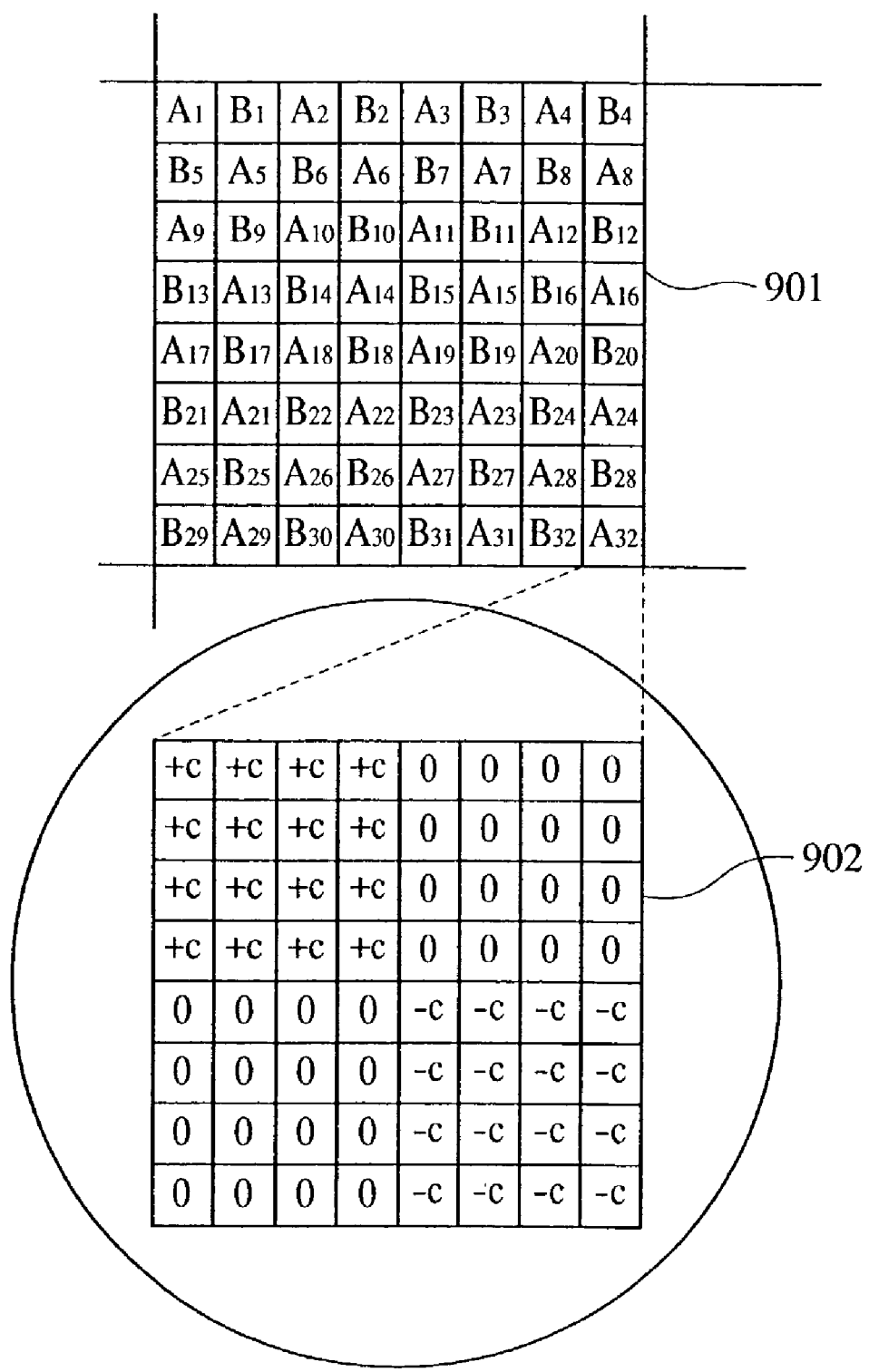
FIG. 8 shows an example of a mask and a pattern used for embedding a digital watermark.

In the present invention, the above-described method is adopted in the following manner. For example, a mask 901 shown in FIG. 8 is allocated to the image 201A or 201B, and density modulation for embedding a digital watermark is performed to only the parts of the image corresponding to $A_n$(n=1 to 32) of the mask 901. More specifically, an 8×8-pixel pattern as shown by 902 is allocated to the $A_n$ and each pixel is modulated in accordance with each modulation width constituting the pattern 902. Also, in this case, by embedding one-bit information into each $A_n$, 32-bit information can be embedded in one mask. By laying the mask repeatedly, the same 32-bit information is embedded repeatedly as a digital watermark. Also, in modulation using an 8-pixel pattern, 1 or 0 is represented by switching addition/subtraction of the pattern in accordance with whether the one-bit embedded to the corresponding $A_n$ is 1 or 0.

Since the above-described method is known, further description will be omitted.

Figure 9:
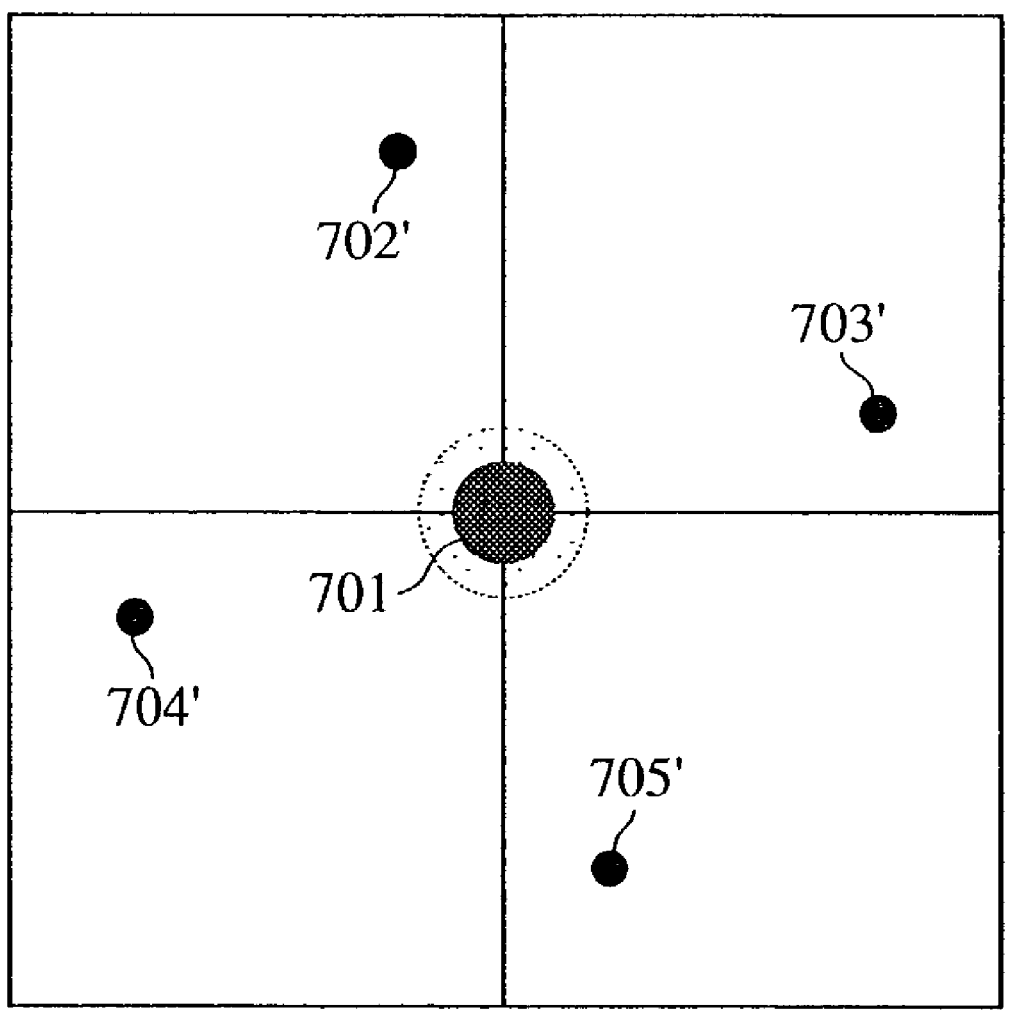
FIG. 9 shows an example of frequency components of the image before extracting the digital watermark.

7. Process Before Extracting Digital Watermark 7-1. Detection of Information Indicating Existence of Digital Watermark Now, a method for analyzing whether or not a digital watermark is embedded in the image at S504 will be described. At S504, the process is performed on the assumption that the impulse signals, 702 to 705 shown in FIG. 6 or the impulse signals 806 to 809 shown in FIG. 7 are embedded in the frequency space of the image 201A or 201B with the algorithm described in 5-1. Thus, the image held at S503 is frequency-converted. Then, some medium- and high-frequency components and the threshold are compared. As a result, as shown in FIG. 9, peak portions 702' to 705' whose values are higher than the threshold can be detected. The number of detected peak portions is four, which is the same as the number of the impulse signals 702 to 705 shown in FIG. 6. Also, the positioning on frequency components of the peak portions is similar to that of the impulse signals. In this case, it is determined that a digital watermark is embedded in the image which is now being processed. On the other hand, when the number of peak portions does not match, or when the positioning of the peak portions is clearly changed, it is determined that a digital watermark is not embedded in the image which is now being processed.

7-2. Detection of Information Used as Reference of Image Correction and Image Correction Now, the determination of whether or not correction is necessary before extracting a digital watermark from the taken image at S507 and a specific method of image correction used at S508 will be described.

Whether or not the image should be corrected before extracting a digital watermark from the taken image 201A or 201B and which type of correction should be performed can be determined by detecting the additional information (impulse signal) described in 5-2.

In this embodiment, the impulse signals 702 to 705 shown in FIG. 6 or the impulse signals 802 to 805 shown in FIG. 7, which have been frequency-converted, must be embedded in the image 201A or 201B.

Figure 10:
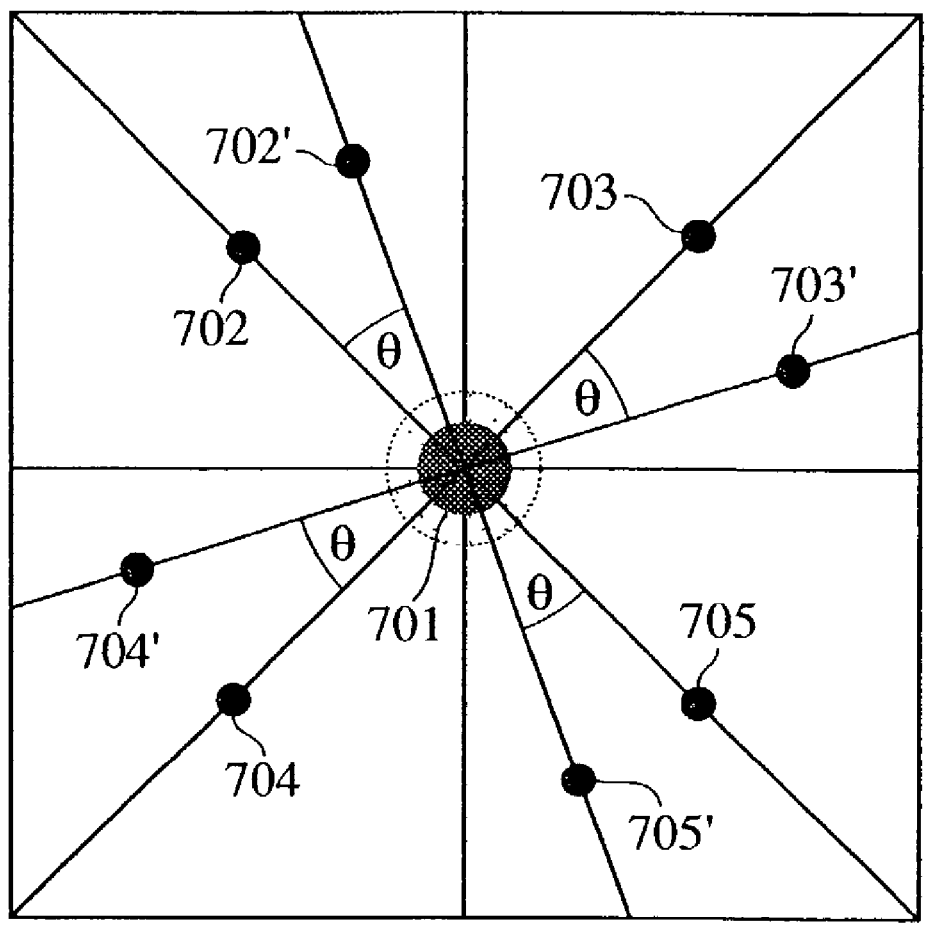
FIG. 10 shows an example of frequency components of the image before extracting the digital watermark.

Thus, in this system, on the assumption that the impulse signals 702 to 705 shown in FIG. 6 are embedded in the image 201A or 201B, if four peak portions 702' to 705' as shown in FIG. 10 are detected from frequency components generated by frequency-converting the image 201A or 201B, it can be determined that the image 201A or 201B has rotated by θ degree, with the image which should be normally recognized being the reference. Therefore, the taken image 201A or 201B can be corrected by rotating it by −θ degree.

Figure 11:
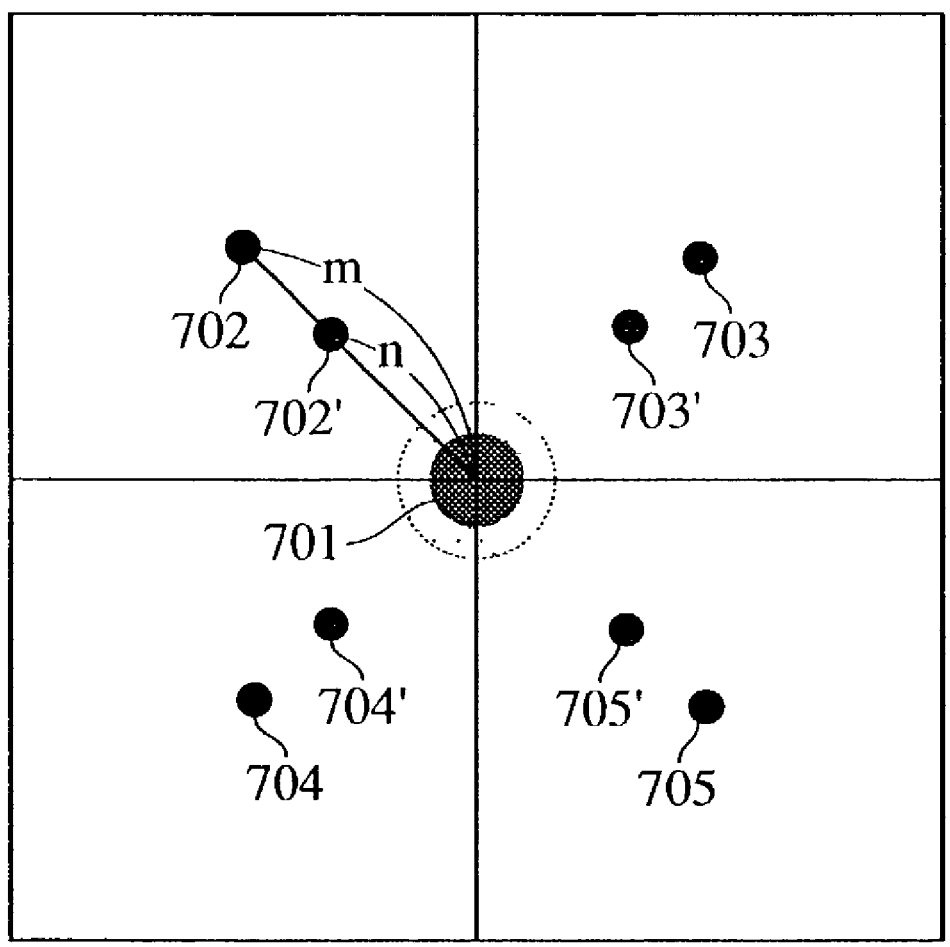
FIG. 11 shows an example of frequency components of the image before extracting the digital watermark.

Also, when four peak portions 702' to 705' as shown in FIG. 11 are detected, it can be determined that the image 201A or 201B has been scaled by m/n times (enlarged in FIG. 11 because n<m), with the image which should be normally recognized being the reference. Therefore, the taken image 201A or 201B can be corrected by scaling it by n/m times.

When both rotation and scaling are required, determination is performed based on each correction reference, and each geometric correction is performed independently.

In the detection of additional information indicating the existence of a digital watermark described in 7-1 and additional information which is a reference of image correction described in 702, it may be effective to place priority on speed rather than accuracy. For example, only a rough analysis: it is highly possible that a digital watermark exists, is performed in 7-1 or 7-2, the image processor 400E accurately performs the processes described in 7-1 and 7-2 after receiving the image 201A or 201B, and then the digital watermark is extracted. This method is effective in terms of the processing speed.

At this time, when the image is corrected by the image processor 400E at S606 shown in FIG. 5, analysis of parallel displacement is performed after the analysis of rotation and scaling (and linear transformation including them) has been performed.

8. Extraction of Digital Watermark

Next, a method of extracting a digital watermark from the image 201A or 201B including a digital watermark after the image correction described in 7-1 and 7-2 will be described.

Basically, a user can easily extract the digital watermark if he/she knows all algorithms at the embedding of the digital watermark, and the extraction method should not be limited to one.

Herein, a known extraction method corresponding to the above-described known method of embedding a digital watermark is adopted.

In this embodiment, as described in the aforementioned Japanese Patent Laid-Open No. 2001-119562, the correction of displacement (offset) caused by parallel displacement is performed at the beginning of the extraction of the digital watermark. At this time, a normally recognized image 201A or 201B is used as the reference.

The device for extracting a digital watermark (image processor 400E) extracts the digital watermark by performing convolution operation by a pattern based on the pattern 902 with respect to the image 201A or 201B, on the assumption that the digital watermark is embedded in the image 201A or 201B by using the mask 901 or the pattern 902 shown in FIG. 8.

In order to recognize and correct the displacement (offset) described at S605 and S606, only predetermined several fixed bits forming the digital watermark are extracted by performing convolution operation in a pattern based on the pattern 902 with respect to the start position of embedding possible digital watermark (allocated position of the mask 901/pattern 902) in the image 201A or 201B. Then, among the result extracted at each position, the most reliable position is determined to be the start position of embedding the normal digital watermark (adequate start position of extraction). When the adequate start position of extraction is different from the start position of extraction defined by the image processor 400E as the default position, the adequate start position is corrected to the default position.

Then, after the displacement is corrected, the process corresponding to S608 is performed. That is, all bits forming the digital watermark are extracted by performing convolution operation with respect to the image. This technique is known, and thus a detailed description will be omitted.

9. Selection/Generation of Information to be Transmitted

Now, an example of selection/generation of information to be transmitted at S610 will be described in detail.

At S611, the image processor 400E transmits information which is directly indicated by the digital watermark embedded in the image to the terminal 100A or 100B which has sent the image. Also, the image processor 400E transmits information valuable for the user of the terminal to the terminal, as additional information.

FIG. 12 is a conceptual diagram in which the additional information is defined in a table. Actually, the RAM 407 of the image processor 400E holds a database corresponding to this table.

As described above, the image processor 400E can recognize the current position of the terminal which has transmitted the image. In addition, the image processor 400E can recognize ID information unique to the terminal (telephone number, device number, user, model information, etc.) and/or attribute information such as the sex, hobby, and status of the user. Thus, the image processor 400E specifies the optimal additional information X to be transmitted to the terminal based on the information with reference to the table shown in FIG. 12. For example, when an image is transmitted from the terminal at Location A in FIG. 1 and when it is determined that the ID information specifying the terminal belongs to the group a, additional information $X_{A, a}$ can be specified by using the table.

As an example, the image transmitted from Location A is an image created by photographing a national common poster displayed at a chain fast food shop at Location A. The information directly indicated by the digital watermark is the name of the shop and additional information $X_{A, a}$ is information of a campaign service aimed at the group a offered by the fast food shops in the area including Location A.

As another example, the image transmitted from Location B is an image created by photographing a brochure of a movie printed in a magazine. The information directly indicated by the digital watermark is the title of the movie and additional information $X_{B, b}$ is information of the theater which is closest to Location B and which plays the movie. Further, the additional information $X_{B, b}$ indicates that the persons of group b can watch the movie at a discount.

As another example, Location F is near a station and the image transmitted from Location F is an image created by photographing a poster of a bus company. The information directly indicated by the digital watermark is the name of the bus company, and additional information $X_{F, c}$ is destinations of the buses which depart from the station, timetable, and fare applied to the persons of group c.

As another example, Location G is a moving car and the image transmitted from Location G is an image created by photographing an image on paper. The information directly indicated by the digital watermark is the name of the service offered by the company owning the image, and additional information $X_{G, d}$ is an audio guidance for guiding the area where the car runs through according to the nationality of the persons belonging to group d, and a map.

The additional information X specified in this way is transmitted to the terminal together with the information directly indicated by the digital watermark at S611.

Then, at S515, each portable terminal outputs the above-described digital watermark and the additional information through a suitable output medium (display or speaker).

By providing a system in which a portable terminal and an image processor can perform the above-described processes together, a user can obtain various useful information according to the position of the user or attribute of the user, if the user carries a portable terminal provided with a camera.

Modification

The present invention may be applied to part of a system including a plurality of devices (for example, a host computer, an interface device, a reader, and a printer), or may be applied to part of a device (for example, a copying machine or a fax machine).

Also, the present invention is not limited to the device and the method for realizing the foregoing embodiment. Alternatively, a program code of software for realizing the foregoing embodiment may be provided to a computer (a CPU or MPU) in the above-described system or device so that the computer operates the various devices in accordance with the program code.

In that case, the program code itself of the software realizes the above-described embodiment. Therefore, the program code itself and a unit for providing the program code to the computer, that is, a storage medium for storing the program code are included in the scope of the present invention.

As storage media for storing the program code, a floppy disk, a hard disk, an optical disk, a magnetooptical disk, a CD-ROM, a DVD, a magnetic tape, a nonvolatile memory card, a ROM, and so on can be used.

Also, the program code is included in the scope of the present invention when the program code is executed in collaboration with an operating system (OS) operating in the computer or other application software so as to realize the foregoing embodiment, as well as when the computer controls the various devices in accordance with only the provided program code so as to realize the foregoing embodiment.

Further, after the provided program code is stored in a memory provided in an expansion board of the computer or an expansion unit connected to the computer, a CPU or the like provided in the expansion board or the expansion unit may perform part or all of actual processes based on the command of the program code so as to realize the foregoing embodiment.

As described above, according to the present invention, various services using a digital watermark technique can be provided by using a portable terminal which can process a high-definition image to which a digital watermark can be embedded. More specifically, by allowing the portable terminal which cannot extract a digital watermark to perform part of processes required for extraction, a service using digital watermark information embedded in images existing in many places can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A portable terminal system comprising:
   a portable terminal provided with a camera inside or outside thereof, the camera being able to take a still image; and
   an image processor performing wireless communication with the portable terminal through a predetermined base station,
   wherein the portable terminal comprises:
      holding means for holding the still image taken by using the camera; and
      wireless communication means for wirelessly transmitting the still image held by the holding means to the predetermined base station, and wherein
   the image processor comprises:
      receiving means for receiving the still image through the predetermined base station;
      an image correcting means for performing a predetermined image correction to the still image based on part of the still image received by the receiving means;
      extracting means for extracting a digital watermark embedded in the still image received by the receiving means, the digital watermark being visually imperceptible, the extracting means extracting the existence and contents of the digital watermark from the still image after the image is corrected by the image correcting means; and
      returning means for returning additional information according to the digital watermark extracted by the extracting means to the predetermined base station,
   wherein the portable terminal receives the additional information through the predetermined base station by using the wireless communication means so as to hold the additional information in the holding means.

2. The portable terminal system according to claim 1, wherein the portable terminal further comprises a speaker, which is used for outputting sound according to the additional information held in the holding means.

3. The portable terminal system according to claim 1, wherein the portable terminal further comprises a display, which is used for displaying an image according to the additional information held in the holding means.

4. The portable terminal system according to claim 1, wherein the portable terminal further comprises determining means for determining whether or not the digital watermark, which is visually imperceptible, is embedded in the still image held in be holding means.

5. The portable terminal system according to claim 4, wherein the portable terminal indicates a result generated by the determining means.

6. The portable terminal system according to claim 1, wherein the portable terminal further comprises an image correcting means for performing a predetermined image correction to the still image based on part of the still image held in the holding means.

7. The portable terminal system according to claim 6, wherein the predetermined image correction is a geometric correction of the still image.

8. The portable terminal system according to claim 1, wherein the image processor recognizes a position of the portable terminal and specifies the additional information to be transmitted from the returning means to the portable terminal based on the position.

9. The portable terminal system according to claim 8, wherein the image processor adds information about a surrounding area of the position to the additional information based on the position.

10. The portable terminal system according to claim 1, wherein an ID unique to the portable terminal is given to the portable terminal, and the image processor recognizes the ID and specifies the additional information to be transmitted from the returning means to the portable terminal based on the ID.

11. The portable terminal system according to claim 10, wherein the ID includes one of a device number given to the portable terminal when manufactured, a telephone number given to the portable terminal when the portable terminal is used, and information indicating a user of the portable terminal.

12. The portable terminal system according to claim 1, wherein an attribute given to a user of the portable terminal is registered on the portable terminal, and the image processor recognizes the attribute and specifies the additional information to be transmitted from the returning means to the portable terminal based on the attribute.

13. The portable terminal system according to claim 1, wherein an ID unique to the portable terminal is given to the portable terminal, and the image processor recognizes a position and the ID of the portable terminal and specifies the additional information to be transmitted from the returning means to the portable terminal based on the position and the ID.

14. The portable terminal system according to claim 1, wherein an attribute given to a user of the portable terminal is registered on the portable terminal, and the image processor recognizes a position and the attribute of the portable terminal and specifies the additional information to be transmitted from the returning means to the potable terminal based on the position and the attribute.

15. An operation method of a portable terminal system comprising a portable terminal provided with a camera inside or outside thereof, the camera being able to take a still image; and an image processor performing wireless communication with the portable terminal through a predetermined base station, the method comprising the steps of:
    in the portable terminal;
        holding a still image taken by the camera; and
        transmitting the still image to the predetermined base station, and in the image processor;
        receiving the still image trough the predetermined base station;
        performing a predetermined image correction to the still image based on part of the still image;
        extracting a digital watermark embedded in the received still image, the digital watermark being visually imperceptible, wherein the existence and contents of the digital watermark are extracted from the still image after the image is corrected; and
        returning additional information according to the extracted digital watermark to the predetermined base station,
    wherein the portable terminal receives the additional information through the predetermined base station wirelessly so as to hold the additional information.

16. The method according to claim 15, wherein a speaker provided in the portable terminal outputs sound according to the held additional information.

17. The method according to claim 15, wherein a display provided in the portable terminal displays an image according to the held additional information.

18. The method according to claim 15, wherein the portable terminal determines whether or not the digital watermark, which is visually imperceptible, is embedded in the held still image.

19. The method according to claim 18, wherein the portable terminal indicates a result based on the determination.

20. The method according to claim 15, wherein the portable terminal performs a predetermined image correction to the still image based on part of the still image and wirelessly transmits the still image to the predetermined base station.

21. The method according to claim 20, wherein the predetermined image correction is a geometric correction of the still image.

22. The method according to claim 15, wherein the image processor recognizes a position of the portable terminal and specifies the additional information to be transmitted from the image processor to the portable terminal based on the position.

23. The method according to claim 22, wherein the image processor adds information about a surrounding area of the position to the additional information based on the position.

24. The method according to claim 15, wherein an ID unique to the portable terminal is given to the portable terminal, and the image processor recognizes the ID and specifies the additional information to be transmitted from the image processor to the portable terminal based on the ID.

25. The method according to claim 24, wherein the ID includes one of a device number given to the portable terminal when manufactured, a telephone number given to the portable terminal when the portable terminal is used, and information indicating the user of the portable terminal.

26. The method according to claim 15, wherein an attribute given to a user of the portable terminal is registered on the portable terminal, and the image processor recognizes the attribute and specifies the additional information to be transmitted from the image processor to the portable terminal based on the attribute.

27. The method according to claim 15, wherein an ID unique to the portable terminal is given to the portable terminal, and the image processor recognizes a position and the ID of the portable terminal and specifies the additional information to be transmitted from the image processor to the portable terminal based on the position and the ID.

28. The method according to claim 15, wherein an attribute given to a user of the portable terminal is registered on the portable terminal, and the image processor recognizes a position and the attribute of the portable terminal and specifies the additional information to be transmitted from the image processor to the portable terminal based on the position and the attribute.

29. A program stored on a computer readable medium for performing an operation method in a portable terminal system comprising a portable terminal provided with a camera inside or outside thereof, the camera being able to take a still image; and an image processor performing wireless communication with the portable terminal through a predetermined base station, the method comprising the steps of:
    in the portable terminal;
        holding a still image taken by the camera; and
        transmitting the still image to the predetermined base station, and in the image processor;
        receiving the still image through the predetermined base station;
        performing a predetermined image correction to the still image based on a part of the still image;
        extracting a digital watermark embedded in the received still image, the digital watermark being visually imperceptible, wherein the existence and contents of the digital watermark are extracted from the still image after the image is corrected; and
        returning additional information according to the extracted digital watermark to the predetermined base station,
    wherein the portable terminal receives the additional information through the predetermined base station wirelessly so as to hold the additional information.

30. A computer readable storage medium storing a program for performing an operation method in a portable terminal system comprising a portable terminal provided with a camera inside or outside thereof, the camera being able to take a still image; and an image processor performing wireless communication with the portable terminal through a predetermined base station, the method comprising the steps of:
  in the portable terminal;
    holding a still image taken by the camera; and
    transmitting the still image to the predetermined base station, and in the image processor;
    receiving the still image through the predetermined base station;
    performing a predetermined image correction to the still image based on a part of the still image;
    extracting a digital watermark embedded in the received still image, the digital watermark being visually imperceptible, wherein the existence and contents of the digital watermark are extracted from the still image after the image is corrected; and
    returning additional information according to the extracted digital watermark to the predetermined base station,
  wherein the portable terminal receives the additional information through the predetermined base station wirelessly so as to hold the additional information.

31. A portable terminal system comprising:
  a portable terminal provided with a camera inside or outside thereof, said camera being able to take a still image; and
  an image processor performing wireless communication with said portable terminal through a predetermined base station,
  wherein said portable terminal comprises:
    holding means for holding said still image taken by using said camera;
    analyzing means for analyzing whether information is visually imperceptibly embedded in said still image held by said holding means or not, wherein said analyzing means analyzes whether correction is necessary or not before extracting said information from said still image,
    correction means for correcting said still image;
    extracting means for extracting the visually imperceptible information embedded in the still image after the image is corrected by the correction means;
    display means for visually informing an analysis result when information is embedded in said still image; and
    wireless communication means for transmitting ID information of said portable terminal and other information to said predetermined base station by performing wireless communication,
  and wherein said image processor comprises:
    receiving means for receiving said ID information and other information through said predetermined base station;
    holding means for holding said ID information and other information;
    selecting means for selecting information needed by a user of said portable terminal on the basis of said ID information and other information; and
    transmitting means for transmitting said information selected by said selecting means to said portable terminal through said predetermined base station by performing wireless communication.

32. A portable terminal system according to claim 31, wherein said correction is a geometric correction of said still image.

33. A portable terminal system according to claim 32, wherein said correction is rotation of said still image.

34. A portable terminal system according to claim 32, wherein said correction is enlargement or reduction of said still image.

35. A portable terminal system according to claim 31, wherein said other information is information about said user of said portable terminal.

36. A portable terminal system according to claim 35, wherein said other information is information about a sex of said user.

37. A portable terminal system according to claim 35, wherein said other information is information about a hobby of said user.

38. A portable terminal system according to claim 35, wherein said other information is information about a status of said user.

39. An operation method of a portable terminal system comprising a portable terminal provided with a camera inside or outside thereof, said camera being able to take a still image, and an image processor performing wireless communication with said portable terminal through a predetermined base station, wherein said method comprises the steps of:
  in the portable terminal,
    a holding step for holding said still image taken by using said camera;
    an analyzing step for analyzing whether information is visually imperceptibly embedded in said still image held by said holding means or not, wherein said analyzing step analyzes whether correction is necessary or not before extracting said information from said still image;
    a correction step for correcting said still image;
    an extracting step for extracting the visually imperceptible information embedded in the still image after the image is corrected by the correction step;
    a display step for visually informing an analysis result when information is embedded in said still image; and
    a wireless communication step for transmitting ID information of said portable terminal and other information to said predetermined base station by performing wireless communication, and
  in said image processor:
    a receiving step for receiving said ID information and other information through said predetermined base station;
    a holding step for holding said ID information and other information;
    a selecting step for selecting information needed by a user of said portable terminal on the basis of said ID information and other information; and
    a transmitting step for transmitting said information selected by said selecting means to said portable terminal through said predetermined base station by performing wireless communication.

* * * * *